(12) United States Patent  (10) Patent No.: US 7,934,116 B2
Mehrdad  (45) Date of Patent: Apr. 26, 2011

(54) DISASTER RECOVER/CONTINUITY OF BUSINESS ADAPTIVE SOLUTION FRAMEWORK

(75) Inventor: Aidun Mehrdad, Oak Hill, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 625 days.

(21) Appl. No.: 11/534,521

(22) Filed: Sep. 22, 2006

(65) Prior Publication Data

US 2007/0078861 A1 Apr. 5, 2007

Related U.S. Application Data

(60) Provisional application No. 60/722,373, filed on Sep. 30, 2005.

(51) Int. Cl.
*G06F 11/00* (2006.01)
(52) U.S. Cl. .................. 714/2; 714/4; 707/652
(58) Field of Classification Search .................. None
See application file for complete search history.

(56) References Cited

U.S. PATENT DOCUMENTS

| | | | |
|---|---|---|---|
| 5,416,311 A | 5/1995 | Kyriazis | |
| 5,537,533 A | 7/1996 | Staheli et al. | |
| 6,189,079 B1 | 2/2001 | Micka et al. | |
| 6,424,979 B1 | 7/2002 | Livingston et al. | |
| 6,529,944 B1 | 3/2003 | LeCrone | |
| 6,697,960 B1 * | 2/2004 | Clark et al. | 714/15 |
| 6,832,330 B1 | 12/2004 | Boudrie et al. | |
| 6,934,725 B1 | 8/2005 | Dings | |
| 7,296,182 B2 * | 11/2007 | Greenspan et al. | 714/13 |
| 7,370,228 B2 | 5/2008 | Takahashi et al. | |
| 7,386,752 B1 * | 6/2008 | Rakic et al. | 714/2 |
| 2003/0018927 A1 | 1/2003 | Gadir et al. | |
| 2003/0074600 A1 | 4/2003 | Tamatsu et al. | |
| 2003/0126388 A1 | 7/2003 | Yamagami | |
| 2003/0187967 A1 * | 10/2003 | Walsh et al. | 709/223 |
| 2003/0188218 A1 | 10/2003 | Lubbers et al. | |
| 2003/0188233 A1 | 10/2003 | Lubbers et al. | |
| 2004/0034808 A1 | 2/2004 | Day, III et al. | |
| 2004/0123223 A1 | 6/2004 | Halford | |

(Continued)

OTHER PUBLICATIONS

Y-Chen, Lan. A framework for an organization's transition to globalization: investigation of IT issues. In Managing globally with information technology (Book excerpt, pp. 1-11); Year of Publication: 2003. [retrieved on Jul. 17, 2007]. Retrieved from the Internet: <URL: http://idea-group.com/downloads/excerpts/2003/kamel.pdf>.

(Continued)

*Primary Examiner* — Christopher S McCarthy
(74) *Attorney, Agent, or Firm* — Marsh Fischmann & Breyfogle LLP

(57) ABSTRACT

A framework and method for use in determining appropriate information technology system disaster recovery and operational continuity solutions for an enterprise. In one embodiment the method includes identifying (504) business processes associated with achieving a defined mission of the enterprise. Assets of the information technology system are grouped (508) into one or more functional sub-system/data class groups and one or more of the business processes are selected. The functional sub-system/data class groups are mapped (524) to the selected business processes to establish a correspondence between each selected business process and one or more of the functional sub-system/data class groups. Thereafter, each functional sub-system/data class group corresponding with each selected business process is associated (602) with a solution class included in a three-dimensional disruption tolerance decision matrix.

21 Claims, 7 Drawing Sheets

U.S. PATENT DOCUMENTS

| | | |
|---|---|---|
| 2004/0153708 A1 | 8/2004 | Joshi et al. |
| 2004/0158766 A1* | 8/2004 | Liccione et al. ................ 714/4 |
| 2004/0205382 A1 | 10/2004 | Noda et al. |
| 2004/0243650 A1 | 12/2004 | McCrory et al. |
| 2005/0015641 A1 | 1/2005 | Alur et al. |
| 2005/0015657 A1 | 1/2005 | Sugiura et al. |
| 2005/0039069 A1 | 2/2005 | Prahlad et al. |
| 2005/0172162 A1* | 8/2005 | Takahashi et al. ............... 714/4 |
| 2006/0041777 A1* | 2/2006 | Fujibayashi ..................... 714/2 |
| 2006/0047896 A1 | 3/2006 | Nguyen et al. |
| 2007/0078982 A1* | 4/2007 | Aidun et al. ................ 709/225 |
| 2007/0079171 A1* | 4/2007 | Aidun ............................... 714/6 |
| 2007/0255977 A1* | 11/2007 | Liccione et al. ................ 714/4 |
| 2008/0010481 A1* | 1/2008 | Anantharamaiah et al. ...... 714/2 |
| 2008/0133960 A1* | 6/2008 | Wong et al. ..................... 714/2 |
| 2008/0229140 A1* | 9/2008 | Suzuki et al. ................... 714/2 |

OTHER PUBLICATIONS

International Search Report and the Written Opinion of the International Searching Authority, or the Declaration. International Application No. PCT/US 06/37870. Date of Mailing: Nov. 20, 2007.

\* cited by examiner

DISASTER RECOVER/CONTINUITY OF BUSINESS ADAPTIVE SOLUTION FRAMEWORK

RELATED APPLICATION INFORMATION

This application claims priority from U.S. Provisional Application Ser. No. 60/722,373, entitled "DISASTER RECOVER/CONTINUITY OF BUSINESS ADAPTIVE SOLUTION FRAMEWORK" filed on Sep. 30, 2005, which is incorporated by reference herein in its entirety.

FIELD OF THE INVENTION

The present invention relates generally to information technology systems, and more particularly to identifying appropriate solutions for providing desired data recovery and continuity of operation capabilities within an enterprise's information technology system.

BACKGROUND OF THE INVENTION

Enterprises such as, for example, a business, a governmental agency, an educational or non-profit institution or other organization, often utilize and rely on information technology (IT) systems of varying complexity in order to assist in accomplishing or directly accomplish desired objectives of the enterprise. Thus, various assets of the enterprise's IT system including data created, updated and accessed by resources of the system, and possibly also resources external to the IT system (e.g., customers and clients), can be very important to continuing operation of an enterprise. Ensuring that such assets remain available and are recoverable in the event of an occurrence effecting one or more assets of the IT system is an important consideration.

Identifying appropriate solutions for providing such disaster recover/continuity of business capabilities within an enterprise IT system is not a trivial undertaking. One reason is that a single category of solution does not fit all enterprises. While scheduled tape-backups or the like may be appropriate for one enterprise where loss of an entire day's data is not problematic, losing one minute or even one second of data may be unacceptable to another enterprise. Likewise, taking several hours to days to recover from a problem while a tape back-up is retrieved and restored may be acceptable to one enterprise, but another enterprise may need to resume normal operations of its IT system within seconds. Furthermore, a monolithic solution across an enterprise's entire IT system, which vendors may often recommend, typically addresses the most stringent requirements and are generally not the most cost effective solution since not all assets of the IT system necessitate the most stringent solution.

SUMMARY OF THE INVENTION

Accordingly, the present invention provides a comprehensive methodology to identify a flexible and cost effective IT system disaster recovery and operational continuity solution at the enterprise level. In accordance with the present invention, a vendor agnostic framework and methodology provide recommendations for flexible, cost effective and proven solutions at a sub-system and data class level within the enterprise's IT system.

In accordance with one embodiment of the present invention, an enterprise's mission is broken into business processes which are tagged as critical or non-critical. This is accomplished by examining impact to the enterprise mission due to disruption of each business process. Assets of the enterprise's IT system are grouped into functional sub-systems and the data is mapped to data class groups. The functional sub-system/data class groups are evaluated against a three dimensional model represented by a disruption tolerance matrix. This matrix has solution classes for each level of disruption tolerance. Each solution class can potentially be supported by multiple architectures which in turn can be implemented using different product vendors. The three axes included in the matrix represent: (1) how much data can the enterprise tolerate losing in case of a disaster; (2) how quickly does the operation being evaluated need to be restored after a disaster; and (3) how far away is the disaster recovery site from the primary site. The recommended solution for each functional sub-system/data class group depends on the disruption tolerance level, the solution class and the cost of the solution changes. This allows for a flexible, cost effective, and vendor agnostic solution framework. Additionally, the approach of the present invention is comprehensive, product agnostic with the best interest of the customer in mind, looks at the enterprise as collection of sub-systems and data classes, and provides the disaster recovery and business continuity solution at that level tempered by actual business impact and disruption that can be tolerated.

According to one aspect of the present invention, a method for use in determining appropriate information technology system disaster recovery and operational continuity solutions for an enterprise includes identifying business processes associated with achieving a defined mission of the enterprise. Assets of the information technology system are grouped into one or more functional sub-system/data class groups, and one or more of the business processes are selected. The functional sub-system/data class groups are mapped to the selected business processes to establish a correspondence between each selected business process and one or more of the functional sub-system/data class groups. Each functional sub-system/data class group corresponding with each selected business process is then associated with a solution class included in a three-dimensional disruption tolerance decision matrix. At least one list of recommended solutions meeting requirements of the solution classes may then referenced to identify one or more recommended solutions for implementation within the information technology system.

In one embodiment of the method, the information technology system includes at least one primary site at which data is stored and at least one secondary site at which the data stored at the primary site is to be replicated, and the disruption tolerance decision matrix includes a first axis representing data loss if a disaster event occurs at the primary site, a second axis representing operational down time following a disaster event at the primary site, and a third axis representing packet delay time between the primary site and the secondary site. In this regard, the secondary site is also sometimes referred to herein as the disaster recovery site and the packet delay time includes the amount of time it takes for a packet of data to be transmitted from the primary site to the disaster recovery site and for an acknowledgment packet to be transmitted back to the primary site indicating that the original packet of data has been stored at the disaster recovery site. In such an embodiment, the step of associating each functional sub-system/data class group corresponding with each selected business process with a solution class may include identifying a location on the third axis based on a packet delay time expected between the primary and secondary sites, identifying a location on the second axis based on an acceptable operational down time if availability of the functional sub-system/data class group is effected, and identifying a location on the first axis based on an acceptable level of data loss if availability of the functional sub-system/data class group is effected, and selecting a solution class cross-referenced by the combination of identified locations on the first, second and third axes.

According to another aspect of the present invention, a framework useful in selecting appropriate information technology system disaster recovery and operational continuity solutions for an enterprise includes a matrix having first, second and third axes. The information technology system may include at least one primary site at which data is stored and at least one secondary site at which the data stored at the primary site is replicated. The first axis represents a range of acceptable data loss if an event that causes loss of the data at the primary site occurs. The second axis represents a range of acceptable operational resumption times following the event that causes loss of the data at the primary site. The third axis represents a packet delay time between the primary and the secondary sites. The framework also includes a plurality of possible solution recommendations, each recommended solution being cross-referenced by at least one combination of locations along the first, second and third axes.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
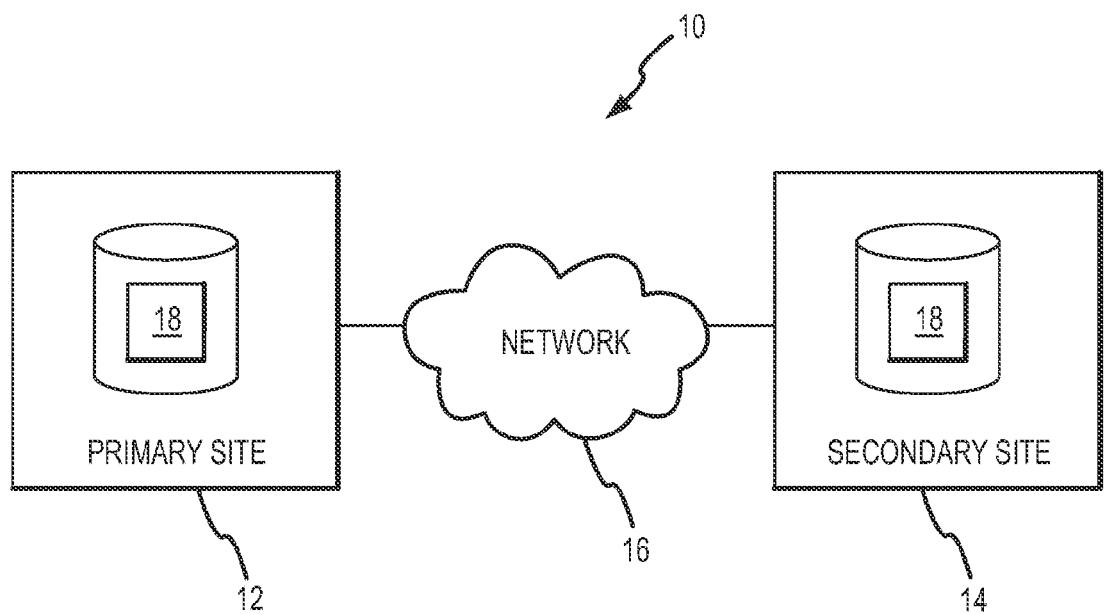
FIG. 1 is a block diagram of an exemplary IT system of an enterprise.

FIG. 1 shows one embodiment of an information technology system 10 that may be utilized by an enterprise. The information technology system 10 includes portions located at a primary site 12 and portions located at a secondary site 14. The primary site 12 may be geographically remote from the secondary site 14 such that conditions effecting the operation of portions of the information technology system 10 at the primary site 12 may not necessarily be present at the secondary site 14. In this regard, the primary site 12 and the secondary site 14 may, for example, be located in different buildings, in different towns, in different states, or even in different countries. Regardless of the location of the secondary site 14 relative to the primary site 12, both sites 12, 14 are enabled for communication therebetween via a data network 16 so that data 18 created and/or stored at the primary site 12 can be communicated to and replicated at the secondary site 14. The data 18 may be accessed at the secondary site 14 and recovered therefrom in the event of an occurrence (e.g., an equipment failure, a power failure, a natural disaster, or a terrorist attack or other man-made event) that causes loss of data access at the primary site 14. Such an occurrence may be referred to herein as a "disaster event".

Since, some of the data 18 may be more critical than other portions of the data 18 to achieving a defined mission of the enterprise, all of the data 18 created and/or stored at the primary site 12 need not necessarily be replicated at the secondary site 14 or made available from the secondary site 14 following a disaster event under the same conditions. In view of this and other considerations, one or more disaster recovery and operational continuity solutions may be appropriately employed within the information technology system 12.

Figure 2:
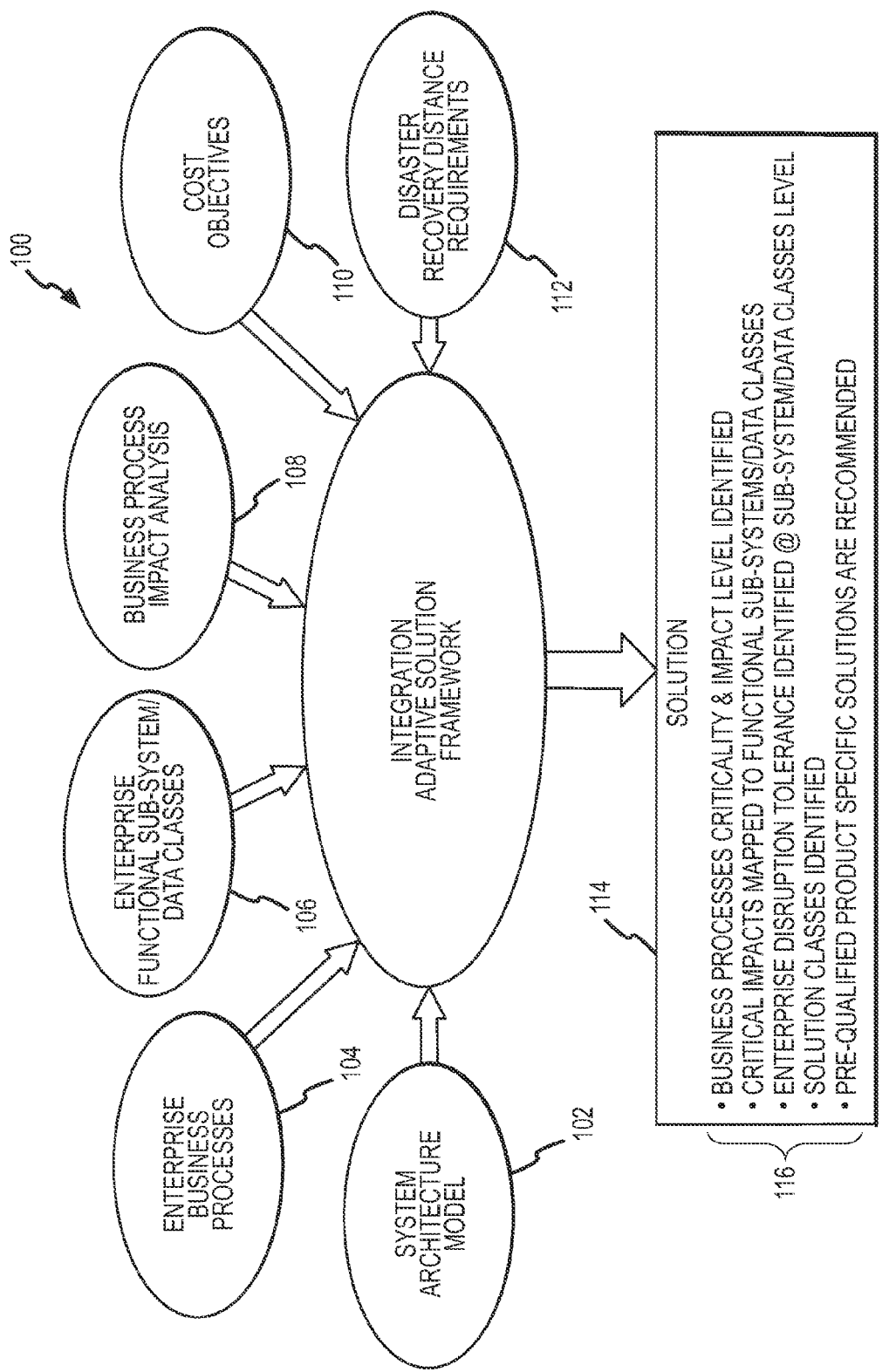
FIG. 2 is a diagrammatic representation showing the operation of one embodiment of a virtualized integration adaptive solution framework in accordance with the present invention.

FIG. 2 provides an overview of the operation of one embodiment of a virtualized integration adaptive solution framework 100 (the framework 100) that assists selection of appropriate disaster recovery and operational continuity solutions for incorporation into an enterprise's information technology system, such as, for example the information technology system 10 shown in FIG. 1. The framework 100 may also be applied to information technology systems configured differently than in FIG. 1 such as, for example, information technology systems having an intermediary site between the primary and secondary sites.

The framework 100 receives a number of inputs. The inputs to the framework 100 include a system architecture model 102, enterprise business processes 104, enterprise functional sub-system/data classes 106, business process impact analysis 108, cost objectives 110, and disaster recovery distance requirements 112.

The system architecture model 102 includes information describing various resources located in the information technology system, the physical location of such resources, and network addresses associated with such resources. The enterprise business processes 104 include descriptions of one or more business processes that enterprise engages in to accomplish a defined mission of the enterprise. The enterprise functional sub-system/data classes 106 include one or more groups of various hardware, software and data assets of the information technology system. The business process impact analysis 108 includes assessments regarding the impact that unavailability of one or more functional sub-system/data classes 106 is expected to have on executing business processes of the enterprise. The cost objectives 110 include a range of budget monetary amounts for providing disaster recovery solutions within the information technology system. The disaster recovery distance requirements include information regarding anticipated geographic distances between physical locations in the information technology system.

The various inputs 102-112 are input to the framework 100 which processes the inputs 102-112 to determine an appropriate disaster recovery and operational continuity solution 114 for the enterprise's information technology system. The solution 114 derived by the framework 100 may incorporate one or more different technologies and includes a number of characteristics/considerations 116. Among the characteristics/considerations 116 of the solution 114 are: (1) the criticality and impact levels associated with the enterprise's business processes are identified; (2) critical impacts are mapped to functional sub-systems/data classes; (3) enterprise disruption tolerance is identified at sub-system/data classes level; (4) solution classes are identified; and (5) pre-qualified product specific solutions are recommended.

Figure 3:
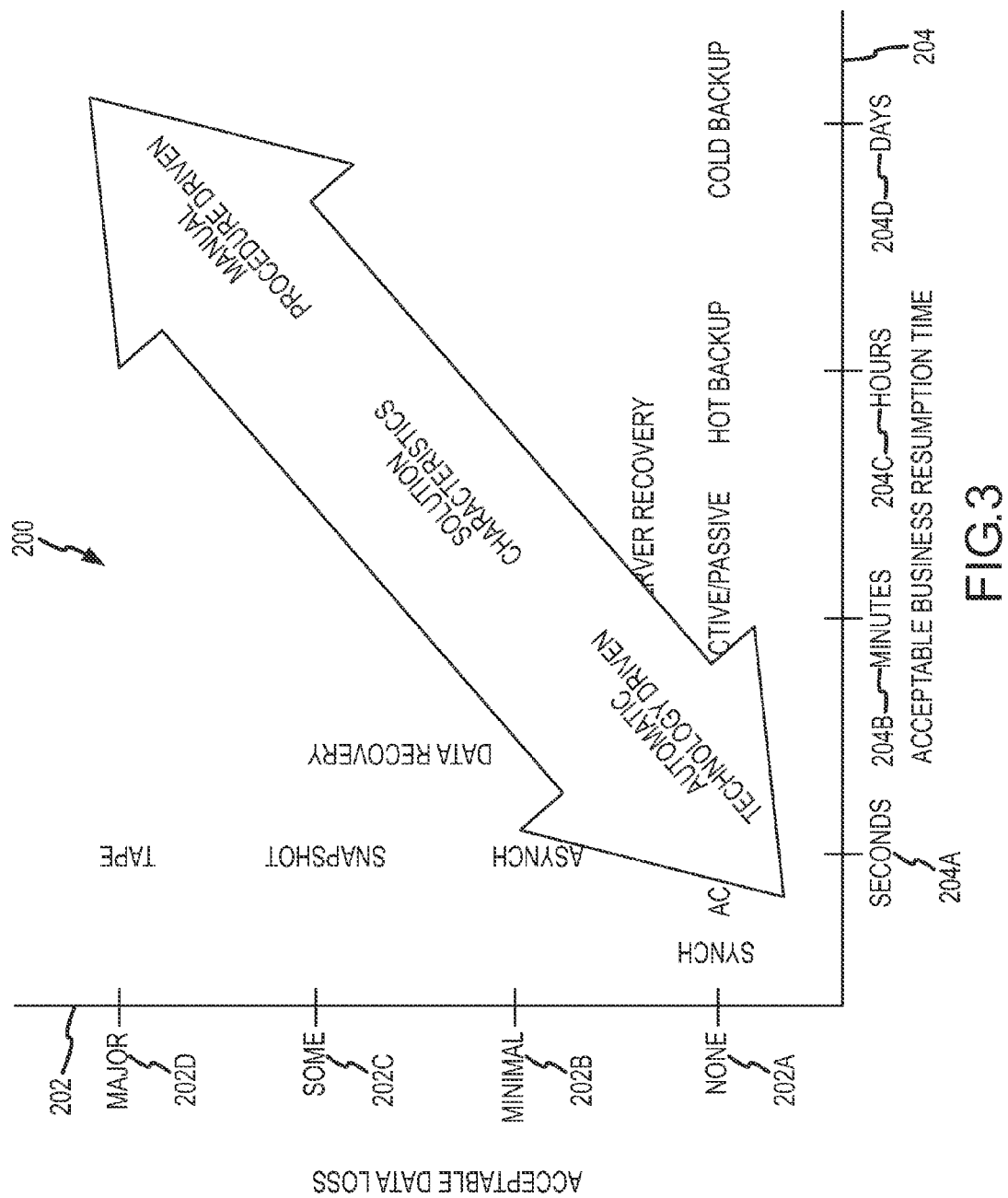
FIG. 3 shows an exemplary two-dimensional disruption tolerance decision matrix in accordance with the present invention.

FIG. 3 shows a disruption tolerance decision matrix 200. The disruption tolerance decision matrix 200 includes a first axis 202 and a second axis 204. The first axis 202 represents a range of acceptable data loss if a disaster event occurs. The range of acceptable data loss along the first axis 202 may be divided into a number of different categories such as, for example, a none or no data loss category 202A, a minimal data loss category 202B, a some data loss category 202C and major data loss category 202D. In the no data loss category 202A, a data writing operation involves synchronously storing the data at both a primary site and a backup site so that there is no amount of lost data with available data backup technology. In the minimal data loss category 202B, more lost data than in the no data loss category 202A but less than in the some data loss category 202C is allowable if a disaster event occurs (e.g., up to few minutes worth of data transaction loss). In the some data loss category 202C, more lost data than in the minimal data loss category 202B but less than in the major data loss category 202D is allowable if a disaster event occurs (e.g., up to few hours worth of data transaction loss). In the major data loss category 202D, more lost data than in the some data loss category 202C is allowable if a disaster event occurs (e.g., up to days worth of data transaction loss). Although four categories 202A-202D of acceptable data loss are described in connection with the present embodiment, in other embodiments, the range of acceptable data loss may be categorized differently and/or categorized using fewer or more than four categories.

The second axis 204 of the disruption tolerance decision matrix 200 represents a range of acceptable business resumption times following a disaster event. The range of acceptable business resumption time following a disaster event represents how long an amount of time is acceptable until business critical information technology applications are again available and operational. The range of acceptable business resumption time along the second axis 204 may be divided into a number of different categories such as, for example, seconds 204A, minutes 204B, hours 204C, and days 204D. Although the range of acceptable business resumption time is divided into four categories 204A-204D in the present embodiment, in other embodiments, the range of acceptable business resumption time may be categorized differently and/or categorized using fewer or more than four categories.

The disruption tolerance decision matrix 200 shown in FIG. 3 also lists generalized types of data recovery solutions deemed acceptable for the different categories 202A-202D of acceptable data loss along the first axis 202. For the no data loss category 202A of acceptable data loss, synchronous data recovery solutions are acceptable. In this regard, synchronous data recovery solutions include those in which during each data storing operation, both the data being stored and the backup thereof are simultaneously stored during a data storing operation. For the minimal data loss category 202B of acceptable data loss, asynchronous data recovery solutions are acceptable. In this regard, asynchronous data recovery solutions include those in which data stored during a data storing operation is also stored in a backup location during another data storing operation that is executed subsequent to the original data storing operation. In case of a disaster, the data that has been written to the primary site storage and has not yet been written to the backup location, is the amount of data that would be lost. For the some data loss category 202C of acceptable data loss, snapshot data recovery solutions are acceptable. In this regard, snapshot data recovery solutions include those in which stored data is periodically copied to a backup location with several original data writing operations possibly having occurred between each snap-shot that is written to the backup location. For the major data loss category 202D of acceptable data loss, tape data recovery solutions are acceptable. In this regard, tape data recovery solutions include those in which the contents of a data storage device are copied to a tape on a scheduled basis or manually activated basis with significant original data writing operations possibly having occurred in between.

The disruption tolerance decision matrix 200 shown in FIG. 3 also lists generalized types of server recovery solutions deemed acceptable for the different categories 204A-204D of acceptable business resumption time along the second axis 204. For the seconds category 204A of acceptable business resumption time, active/active solutions are acceptable. For the minutes category 204B of acceptable business resumption time, active/passive solutions are acceptable. For the hours category 204C of acceptable business resumption time, hot backup solutions are acceptable. For the days category 204D of acceptable business resumption time, cold backup solutions are acceptable.

The various appropriate types of data recovery solutions appropriate for the categories 202A-202D of acceptable data loss on the first axis 202 and the various appropriate types of server recovery solutions for the categories 204A-204D of acceptable business resumption time on the second axis 204 may be characterized in the manner indicated by the two-headed arrow in FIG. 3. Close to origin where the first and second axes 202, 204 intersect, the data and server recovery solution types become more automated and technology driven, hence typically more expensive. Proceeding away from the origin along the first and second axes 202, 204, the data and server recovery solutions become more manual and procedure driven, hence typically less expensive.

Figure 4:
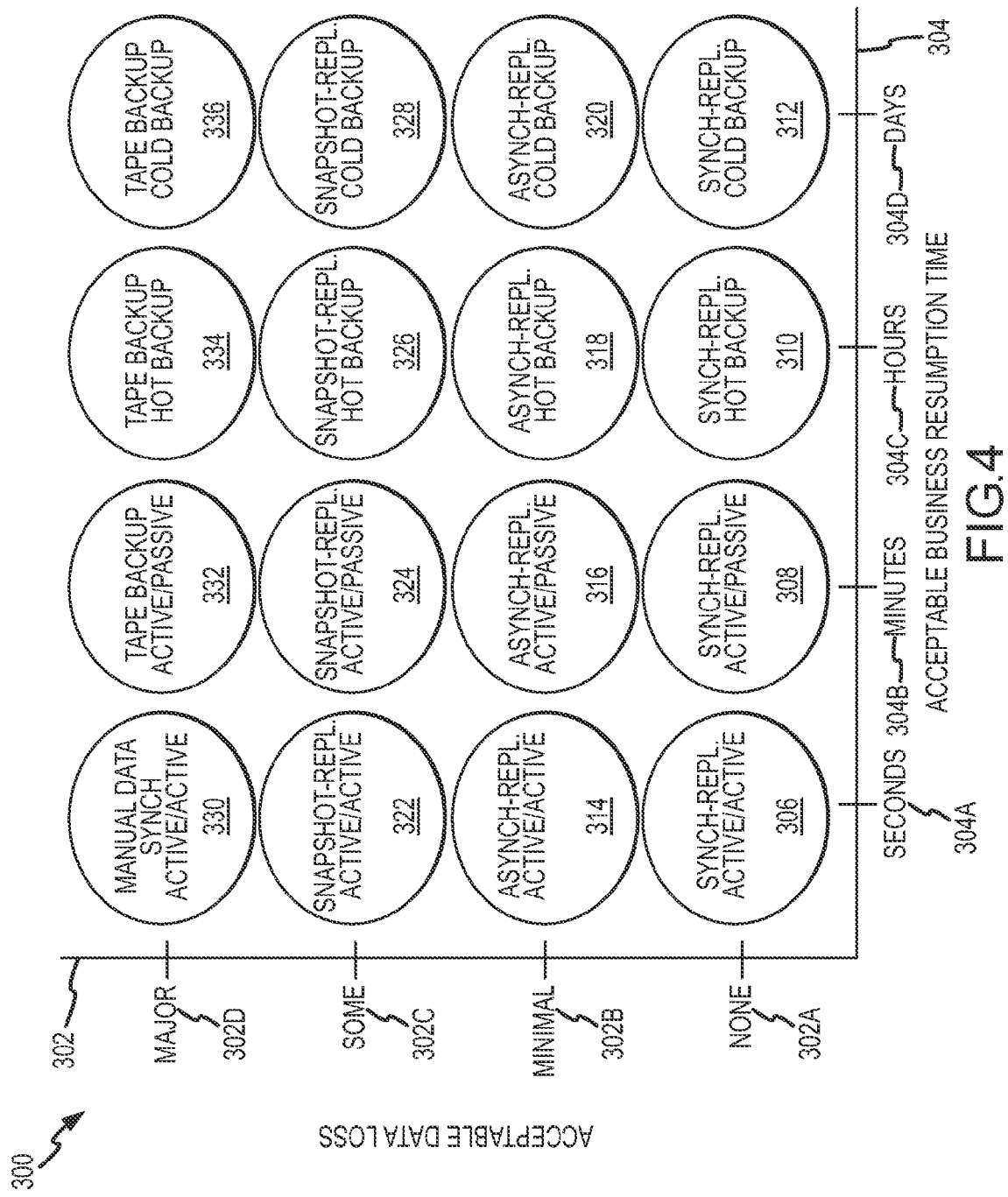
FIG. 4 shows another exemplary two-dimensional disruption tolerance decision matrix in accordance with the present invention.

FIG. 4 provides another view of a disruption tolerance decision matrix 300. In the disruption tolerance decision matrix 300 of FIG. 4, the first axis 302 represents a range of acceptable data loss should a disaster event occur and the range of acceptable data loss along the first axis 302 is divided into the same four categories (none or no data loss category 302A, minimal data loss category 302B, some data loss category 302C and major data loss category 302D) as in the disruption tolerance decision matrix 200 of FIG. 3. The second axis 304 represents a range of acceptable business resumption times following a disaster event and is divided into the same four categories (seconds 304A, minutes 304B, hours 304C, and days 304D) as in the disruption tolerance decision matrix 200 of FIG. 3. The disruption tolerance decision matrix 300 identifies a total of sixteen appropriate data recovery and server recovery solution classes cross-referenced by different combinations of the four categories 302A-302D of acceptable data loss and the four categories 304A-304D of acceptable business resumption time along the first and second axes 302, 304. The sixteen appropriate data recovery and server recovery solution classes include: (1) an active/active synchronous replication solution class; (2) a synchronous replication active/passive solution class; (3) a synchronous replication hot backup solution class; (4) a synchronous replication cold backup solution class; (5) an active/active asynchronous replication solution class; (6) an asynchronous replication active/passive solution class; (7) an asynchronous replication hot backup solution class; (8) an asynchronous replication cold backup solution class; (9) an active/active snap-shot replication solution class; (10) a snap-shot replication active/passive solution class; (11) a snap-shot replication hot backup solution class; (12) a snap-shot replication cold backup solution class; (13) an active/active manual data synchronizing solution class; (14) a tape backup active/passive solution class; (15) a tape backup hot backup solution class; and (16) a tape backup cold backup solution class. In embodiments where the range of acceptable data loss along the first axis 302 is divided into fewer or more than four categories business and/or the range of acceptable business resumption time along the second axis 304 is divided into fewer or more than four categories, the number of cross-referenced data recovery and server recovery solution classes included in the disruption tolerance decision matrix 300 may be fewer or more than sixteen.

Figure 5:
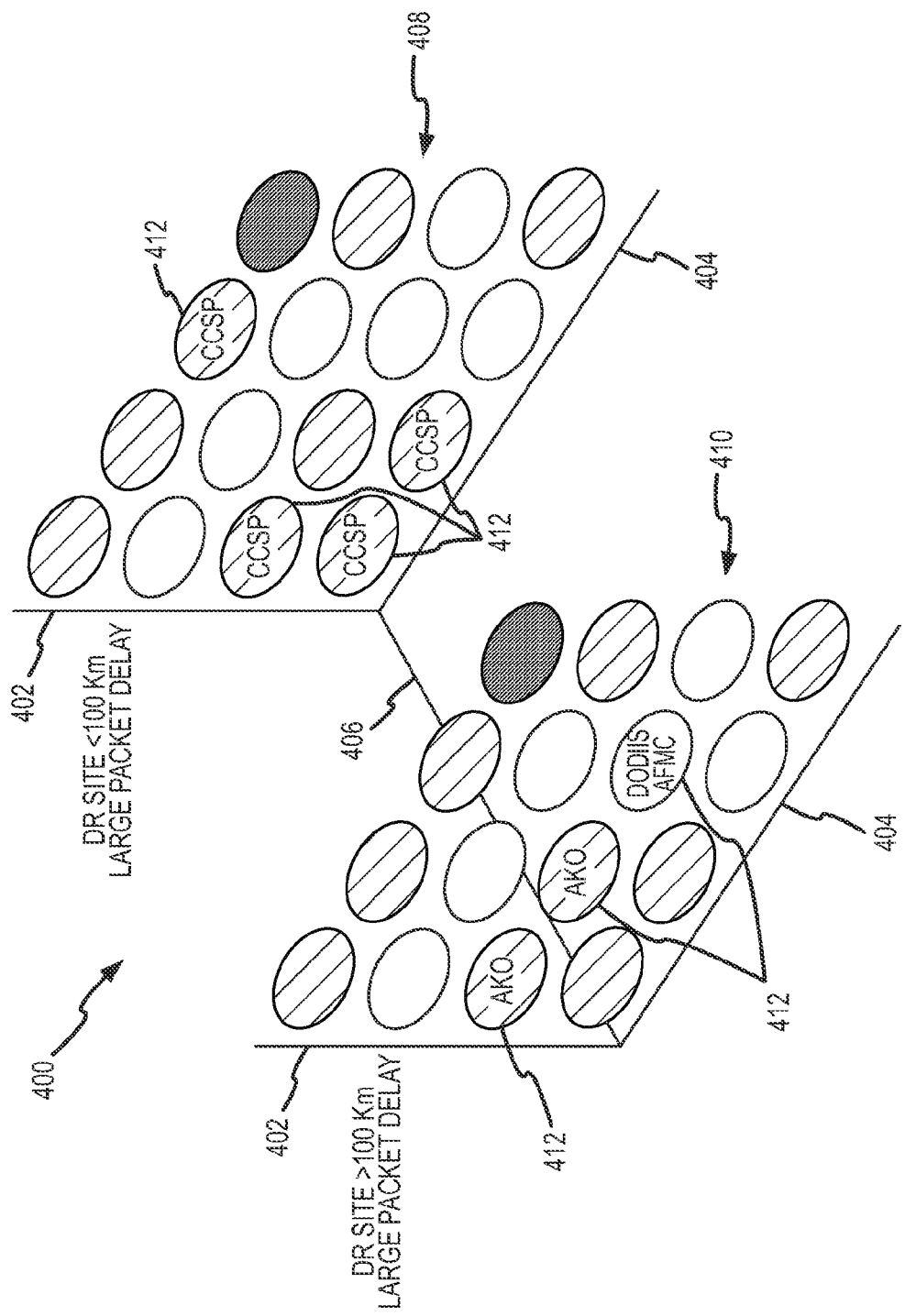
FIG. 5 shows a three-dimensional solution mapping and disruption tolerance decision matrix in accordance with the present invention.

FIG. 5 depicts a three-dimensional solution mapping and disruption tolerance decision matrix 400. The three-dimensional solution mapping and disruption tolerance decision matrix 400 includes first and second axes 402, 404 similar to those in the disruption tolerance decision matrices such as shown in FIG. 3 or 4, wherein the first axis 402 represents a range of acceptable data loss and the second axis 404 represents a range of acceptable operational down-time (acceptable business resumption time in FIGS. 2 and 3) if a disaster event occurs, along with a third axis 406 representing a range of packet delay times between the primary and disaster recovery sites. The third axis 406 is oriented such that the packet delay time increases moving away from the intersection of the first, second, and third axes 402, 404, 406. In other embodiments, the third axis may be oriented such that the packet delay time decreases moving away from the intersection of the first, second, and third axes 402, 404, 406.

In FIG. 5, two possible packet delay time situations are illustrated, namely, a small packet delay situation 408 (e.g., wherein the disaster recovery site is less than 100 km from the primary site) and a large packet delay situation 410 (e.g., wherein the disaster recovery site is more than 100 km from the primary site). In other embodiments, the third axis 406 may be resolved into more than two packet delay time situations (e.g., small, medium and large). Applicable solution classes 412 for various combinations of acceptable data loss along the first axis 402 and acceptable operational down-time along the second axis 404 in the case of the small and large packet delay situations 408, 410 are identified in FIG. 5. As depicted in FIG. 5, applicable solution classes 412 for different combinations of acceptable data loss and acceptable operational down-time may differ between the small packet delay situation 408 and the large packet delay situation 410. In this regard, as an example, in the small packet delay situation 408, applicable solution classes 412 for the "no data loss/seconds operational down-time", "minimal data loss/seconds operational down-time", "no data loss/minutes operational down-time", and "major data loss/hours operational down-time" combinations include Command Communications Survivability Program—Messaging Component Project (CCSP). In the large packet delay situation 410, applicable solution classes 412 for the "minimal data loss/seconds operational down-time" and "minimal data loss/minutes operational down-time" combinations include Army Knowledge Online (AKO) architecture and for the "minimal data loss/hours operational down-time" combination includes Department of Defense Intelligence Information System and Air Force Material Command (DODISS, AFMC) architecture. Where available, the applicable solution class 412 helps to identify appropriate solutions by pre-identifying solutions meeting requirements for inclusion in such solution class 412.

Figure 6:
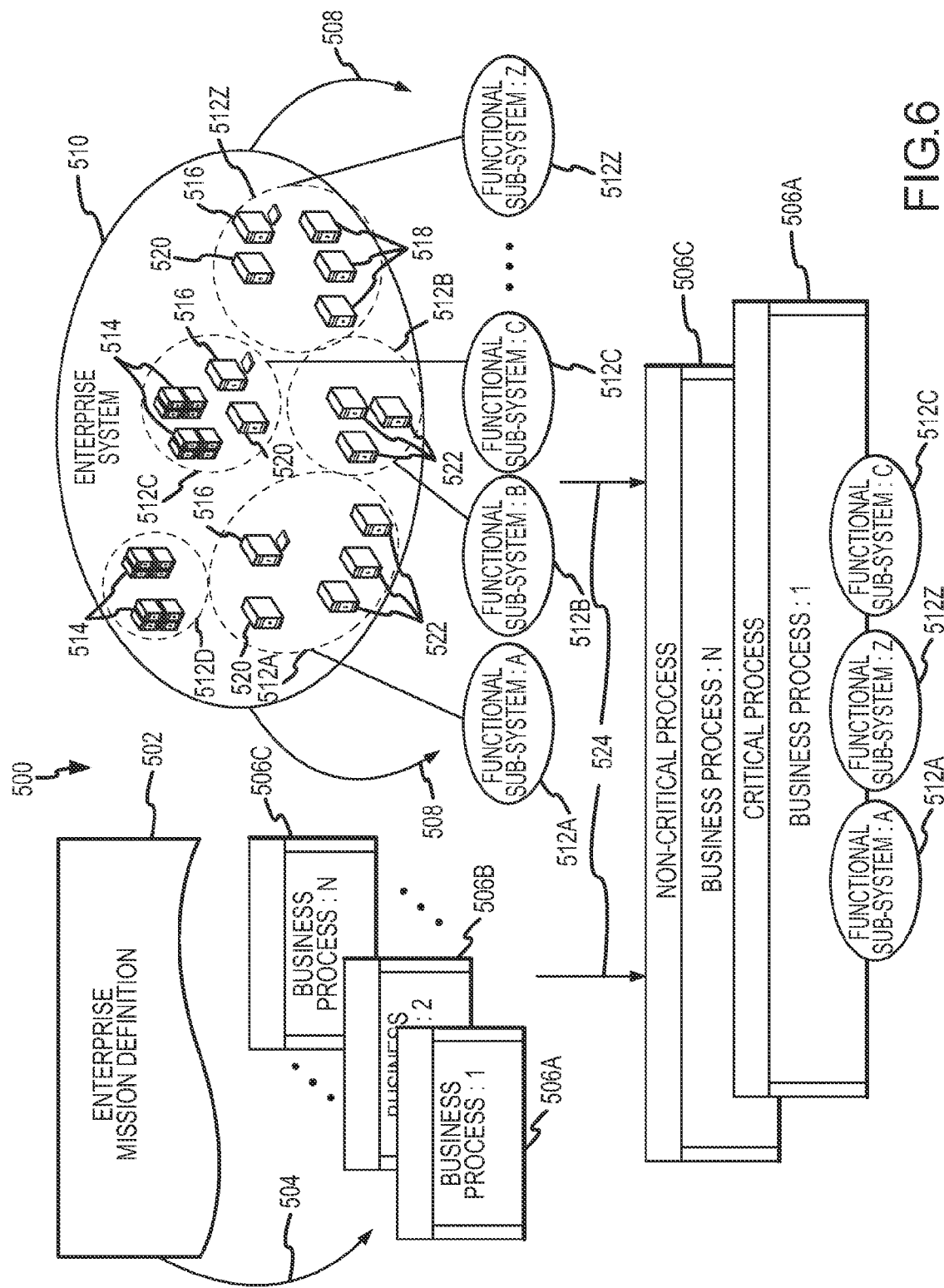
FIG. 6 illustrates an one embodiment of a process of mapping business processes to supporting information technology sub-system/data classes.

FIG. 6 illustrates an exemplary mapping of business processes to supporting information technology sub-system/data classes. The mapping process 500 includes reviewing a mission definition 502 of the enterprise and listing 504 one or more business processes 506A-504C (e.g., business processes 1 to N where N is a positive integer) that enable and/or facilitate achievement of the mission definition 502. Where the enterprise does not already have a mission definition 502, a mission definition may be developed prior to beginning the mapping process 500.

The mapping process 500 also includes grouping 508 assets of the enterprise's information technology system 510 into a number of functional subs-system/data class groups 512A, 512B, 512C, 512D, 512Z. In this regard, the information technology system 510 assets may include, for example, several different types of computing systems 514, 516, 518, 520 and 522. Each type of computing system 514-522 may include various hardware, software and data components, and one or more of the types of computing systems 514-522 may or may not be connected with one another via one or more networks. Although FIG. 6 suggests that there may be five different functional sub-system/data class groups (e.g., functional sub-system/data class groups A, B, C, D and Z), there may be as few as one functional sub-system/data class group or more than five functional sub-system/data class groups identified in the grouping 508 process.

One or more of the computing system types 514-522 may be included in more than one of the functional sub-systems/data classes 512A, 512B, 512C, 512D, 512Z. For example, computing systems of type 514 may be included in both functional subsystems/data classes 512C and 512D, computing systems of type 516 may be included in functional sub-systems/data classes 512A, 512C and 512Z, computing systems of type 520 may be included in functional subsystems/data classes 512A, 512C and 512Z, and computing systems of type 522 may be included in functional subsystems/data classes 512A and 512B. Also, one or more computing system types 514-522 may be included in only one of the functional sub-systems/data classes 512A, 512B, 512C, 512D, 512Z. For example, computing systems of type 518 may be included in only functional sub-system/data class 512Z.

With the business processes 506A-506C identified and the information technology system assets grouped into functional sub-system/data class groups 512A, 512B, 512C, 512D, and 512Z, the mapping process 500 continues with identifying 524 one or more of the functional sub-system/data class groups 512A, 512B, 512C, 512D, and 512Z that support one or more of the business processes 506A-506C. For example, as shown in FIG. 6, functional sub-system/data class groups 512A, 512C and 512Z may be identified as supporting the first business process 506A. Other combinations of one or more of the functional sub-system/data class groups 512A, 512B, 512C, 512D, 512Z may support the other identified business processes 506B, 506C.

Prior to identifying 524 functional sub-system/data class groups 512A, 512B, 512C, 512D, 512Z that support business processes 506A-506C, the business processes 506A-506C may be classified in accordance with one or more levels that define how critical a particular business process 506A-506C is to achievement of the enterprise's mission definition 502. For example, the business processes 506A-506C may be classified as critical or non-critical. In other embodiments, more than two levels may be used in classifying the criticality of the business processes 506A-506C. Thereafter, identification 524 of supporting functional sub-system/data class groups 512A, 512B, 512C, 512D, 512Z may only be done for business processes 506A-506C classified within certain classes (e.g., for only business processes 506A classified as critical).

Figure 7:
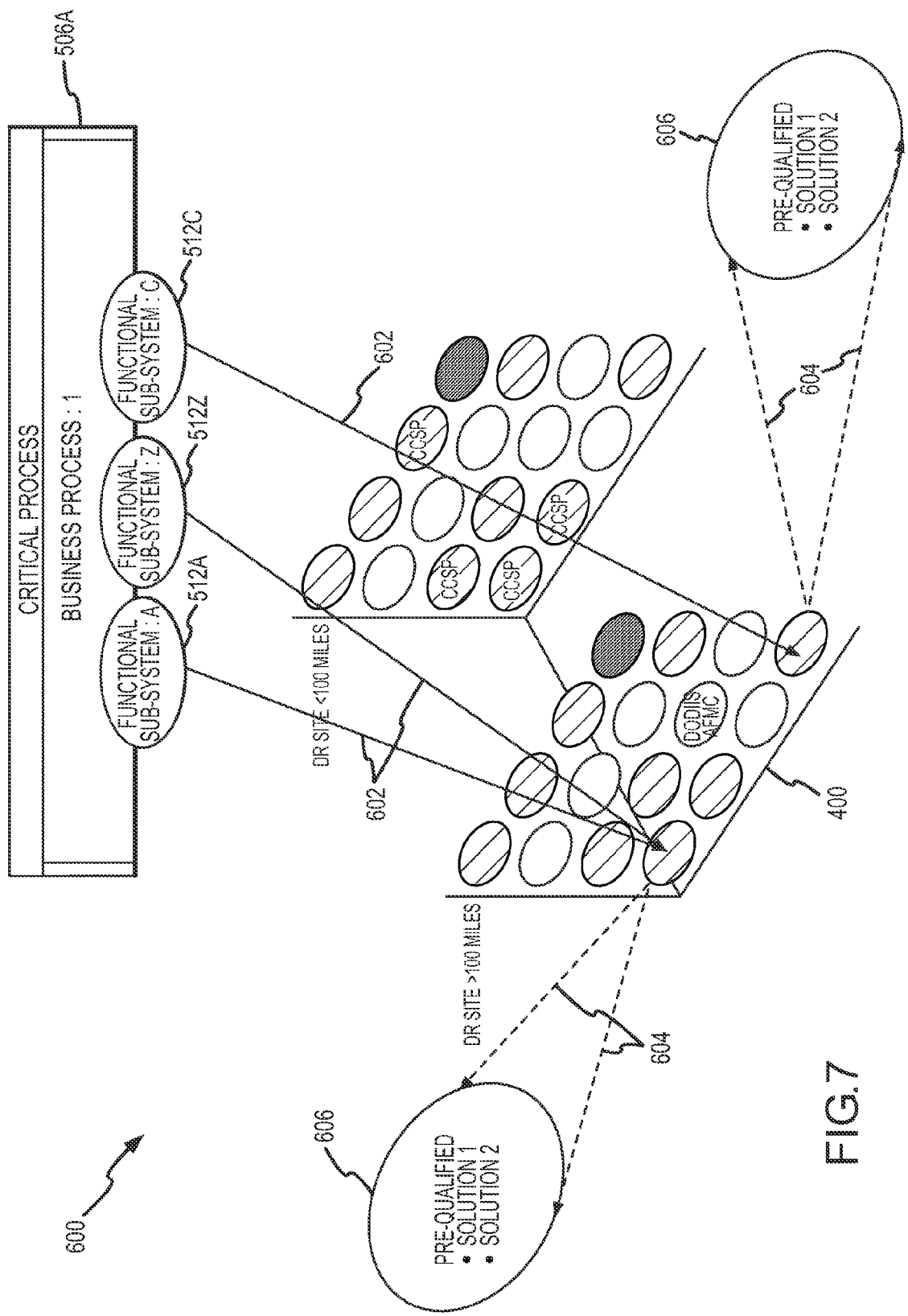
FIG. 7 illustrates one embodiment of a process of mapping supporting functional sub-system/data class groups associated with a particular business process to appropriate solution categories.

FIG. 7 illustrates an exemplary mapping of the supporting functional sub-system/data class groups associated with a particular business process to appropriate solution categories. The functional sub-system/data class group to solution mapping process 600 utilizes a three-dimensional solution mapping and disruption tolerance decision matrix 400 such as shown in FIG. 5. The functional sub-system/data class group to solution mapping process 600 includes associating 602 each functional subs-system/data class group 512A, 512C, 512Z associated with the first business process 506A with a solution class 412 in the solution mapping and disruption tolerance decision matrix 400. In this regard, reference is made to the appropriate situation (e.g., the large packet delay situation 410 in the present example) along the third axis 406 of the matrix 400 for the packet delay situation between the primary and disaster recovery sites. One or more of the solution classes 412 may be associated with more than one functional sub-system/data class group 512A-512Z, one or more of the solution classes 412 may be associated with only one functional sub-system/data class group 512A-512Z, and one or more of the solution classes 412 may not be associated with any of the functional sub-system/data class groups 512A-512Z. For example, functional sub-system/data class groups 512A and 512Z may be associated 602 with a solution class 412 corresponding with the combination of "no data loss" category along the first axis 402 and "seconds of operational down-time" category along the second axis 404, functional sub-system/data class group 512C may be associated 602 with a solution class 412 corresponding with the combination of "no data loss" category along the first axis 402 and "days of operational down-time" category along the second axis 404.

Once a functional sub-system/data class group 512A-512Z is associated with a solution class 412, reference 604 is made to a list 606 of solutions corresponding with each solution class 412 associated with a functional sub-system/data class group 512A-512Z to identify one or more appropriate solutions for the recovering data included in the functional sub-system/data class group if a disaster event were to take place. The corresponding lists 606 include solutions pre-determined to meet the applicable solution class 412. For example, the solutions may have been certified by the organization promulgating the applicable solution class. Different lists 606 may correspond with different solution class 412, although one or more solutions may be common to more than one list 606. Thereafter, a solution may be selected for each functional sub-system/data class group 512A-512Z and implemented within the information technology system to provide the desired level of data protection.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for use in determining appropriate information technology system disaster recovery and operational continuity solutions for an enterprise, the information technology system including at least one primary site at which data is stored and at least one secondary site at which the data stored at the primary site is to be replicated, said method comprising:
    (a) identifying business processes associated with achieving a defined mission of the enterprise;
    (b) grouping assets of the information technology system into one or more functional sub-system/data class groups;
    (c) selecting one or more of the business processes;
    (d) mapping the functional sub-system/data class groups to the selected business processes to establish a correspondence between each selected business process and one or more of the functional sub-system/data class groups;
    (e) associating each functional sub-system/data class group corresponding with each selected business process with a solution class selected from among a plurality of data recovery and server recovery solution classes included in a three-dimensional disruption tolerance decision matrix that includes a first axis representing a range of data loss if an event that causes loss of the data at the primary site occurs, a second axis representing a range of operational resumption times until business critical information technology applications are again available following the event that causes loss of the data at the primary site, and a third axis representing a packet delay time between the primary site and the secondary site, wherein said step of associating each functional sub-system/data class group corresponding with each selected business process with a solution class comprises:
        (i) identifying a location on the third axis based on a packet delay time expected between the primary and secondary sites;
        (ii) identifying a location on the second axis within the range of operational resumption times based on an acceptable operational resumption time if availability of the functional sub-system/data class group is effected;
        (iii) identifying a location on the first axis within the range of data loss based on an acceptable level of data loss if availability of the functional sub-system/data class group is effected, wherein the identified location on the first axis is identified from a plurality of categories of data loss consisting of a no data loss category, a minimal data loss category, a some data loss category, and a major data loss category; and
        (iv) selecting a solution class included in the three-dimensional disruption tolerance decision matrix and cross-referenced by the combination of identified locations on the first, second and third axes; and
    (f) implementing within the information technology system the selected solution class associated with each functional sub-system/data class group.

2. The method of claim 1 wherein, in said step of identifying a location on the third axis, one of a small packet delay situation and a large packet delay situation are identified.

3. The method of claim 1 further comprising:
    classifying each identified business process as being within one of a plurality of criticality levels; and
    wherein in said step of selecting one or more business processes, the one or more business processes are selected based on their criticality levels.

4. The method of claim 3 wherein the plurality of criticality levels include critical and non-critical.

5. The method of claim 1 wherein, in said step of grouping, one or more assets are included in two or more groups.

6. The method of claim 1 wherein, in said step of mapping, a correspondence is established between one or more functional sub-system/data class groups and two or more selected business processes.

7. The method of claim 1 wherein, in said step of selecting a solution class, possible solutions cross-referenced by a location within the no data loss category on the first axis include the following solutions: (1) an active/active synchronous replication solution; (2) a synchronous replication active/passive solution; (3) a synchronous replication hot backup solution; and (4) a synchronous replication cold backup solution.

8. The method of claim 1 wherein, in said step of selecting a solution class, possible solutions cross-referenced by a location within the minimal data loss category on the first axis include the following solutions: (1) an active/active asynchronous replication solution; (2) an asynchronous replication active/passive solution; (3) an asynchronous replication hot backup solution; and (4) an asynchronous replication cold backup solution.

9. The method of claim 1 wherein, in said step of selecting a solution class, possible solutions cross-referenced by a location within the some data loss category on the first axis include the following solutions: (1) an active/active snap-shot replication solution; (2) a snap-shot replication active/passive solution; (3) a snap-shot replication hot backup solution; and (4) a snap-shot replication cold backup solution.

10. The method of claim 1 wherein, in said step of selecting a solution class, possible solutions cross-referenced by a location within the major data loss category on the first axis include the following solutions: (1) an active/active manual data synchronizing solution; (2) a tape backup active/passive solution; (3) a tape backup hot backup solution; and (4) a tape backup cold backup solution.

11. A method for use in determining appropriate information technology system disaster recovery and operational continuity solutions for an enterprise, the information technology system including at least one primary site at which data is stored and at least one secondary site at which the data stored at the primary site is to be replicated, said method comprising:
  (a) identifying business processes associated with achieving a defined mission of the enterprise;
  (b) grouping assets of the information technology system into one or more functional sub-system/data class groups;
  (c) selecting one or more of the business processes;
  (d) mapping the functional sub-system/data class groups to the selected business processes to establish a correspondence between each selected business process and one or more of the functional sub-system/data class groups;
  (e) associating each functional sub-system/data class group corresponding with each selected business process with a solution class selected from among a plurality of data recovery and server recovery solution classes included in a three-dimensional disruption tolerance decision matrix that includes a first axis representing a range of data loss if an event that causes loss of the data at the primary site occurs, a second axis representing a range of operational resumption times until business critical information technology applications are again available following the event that causes loss of the data at the primary site, and a third axis representing a packet delay time between the primary site and the secondary site, wherein said step of associating each functional sub-system/data class group corresponding with each selected business process with a solution class comprises:
    (i) identifying a location on the third axis based on a packet delay time expected between the primary and secondary sites;
    (ii) identifying a location on the second axis within the range of operational resumption times based on an acceptable operational resumption time if availability of the functional sub-system/data class group is effected, wherein the identified location on the second axis is identified from a plurality of categories of operational resumption times consisting of seconds, minutes, hours, and days;
    (iii) identifying a location on the first axis within the range of data loss based on an acceptable level of data loss if availability of the functional sub-system/data class group is effected; and
    (iv) selecting a solution class included in the three-dimensional disruption tolerance decision matrix and cross-referenced by the combination of identified locations on the first, second and third axes; and
  (f) implementing within the information technology system the selected solution class associated with each functional sub-system/data class group.

12. The method of claim 11 wherein, in said step of identifying a location on the third axis, one of a small packet delay situation and a large packet delay situation are identified.

13. The method of claim 11 further comprising:
classifying each identified business process as being within one of a plurality of criticality levels; and
wherein in said step of selecting one or more business processes, the one or more business processes are selected based on their criticality levels.

14. The method of claim 13 wherein the plurality of criticality levels include critical and non-critical.

15. The method of claim 11 wherein, in said step of grouping, one or more assets are included in two or more groups.

16. The method of claim 11 wherein, in said step of mapping, a correspondence is established between one or more functional sub-system/data class groups and two or more selected business processes.

17. The method of claim 11 wherein, in said step of selecting a solution class, possible solutions cross-referenced by a location within the seconds category on the second axis include the following solutions: (1) an active/active synchronous replication solution; (2) an active/active asynchronous replication solution; (3) an active/active snap-shot replication solution; and (4) an active/active manual data synchronizing solution.

18. The method of claim 11 wherein, in said step of selecting a solution class, possible solutions cross-referenced by a location within the minutes category on the second axis include the following solutions: (1) a synchronous replication active/passive solution; (2) an asynchronous replication active/passive solution; (3) a snap-shot replication active/passive solution; and (4) a tape backup active/passive solution.

19. The method of claim 11 wherein, in said step of selecting a solution class, possible solutions cross-referenced by a location within the hours category on the second axis include the following solutions: (1) a synchronous replication hot backup solution; (2) an asynchronous replication hot backup solution; (3) a snap-shot replication hot backup solution; and (4) a tape backup hot backup solution.

20. The method of claim 11 wherein, in said step of selecting a solution class, possible solutions cross-referenced by a location within the days category on the second axis include the following solutions: (1) a synchronous replication cold backup solution;
(2) an asynchronous replication cold backup solution; (3) a snap-shot replication cold backup solution; and (4) a tape backup cold backup solution.

21. A method for use in determining appropriate information technology system disaster recovery and operational continuity solutions for an enterprise, the information technology system including at least one primary site at which data is stored and at least one secondary site at which the data stored at the primary site is to be replicated, said method comprising:

(a) identifying business processes associated with achieving a defined mission of the enterprise;
(b) grouping assets of the information technology system into one or more functional sub-system/data class groups;
(c) selecting one or more of the business processes;
(d) mapping the functional sub-system/data class groups to the selected business processes to establish a correspondence between each selected business process and one or more of the functional sub-system/data class groups;
(e) associating each functional sub-system/data class group corresponding with each selected business process with a solution class selected from among a plurality of data recovery and server recovery solution classes included in a three-dimensional disruption tolerance decision matrix that includes a first axis representing a range of data loss if an event that causes loss of the data at the primary site occurs, a second axis representing a range of operational resumption times until business critical information technology applications are again available following the event that causes loss of the data at the primary site, and a third axis representing a packet delay time between the primary site and the secondary site, wherein said step of associating each functional sub-system/data class group corresponding with each selected business process with a solution class comprises:
  (i) identifying a location on the third axis based on a packet delay time expected between the primary and secondary sites;
  (ii) identifying a location on the second axis within the range of operational resumption times based on an acceptable operational resumption time if availability of the functional sub-system/data class group is effected, wherein the identified location on the second axis is identified from a plurality of categories of operational resumption times consisting of seconds, minutes, hours, and days;
  (iii) identifying a location on the first axis within the range of data loss based on an acceptable level of data loss if availability of the functional sub-system/data class group is effected, wherein the identified location on the first axis is identified from a plurality of categories of data loss consisting of a no data loss category, a minimal data loss category, a some data loss category, and a major data loss category; and
  (iv) selecting a solution class included in the three-dimensional disruption tolerance decision matrix and cross-referenced by the combination of identified locations on the first, second and third axes; and
(f) implementing within the information technology system the selected solution class associated with each functional sub-system/data class group.

\* \* \* \* \*